Dec. 6, 1927. 1,651,828

H. C. MALLORY

ENGINE COOLING SYSTEM

Filed July 22, 1921 2 Sheets-Sheet 1

INVENTOR
HARRY C. MALLORY
BY John E. Hubbell
ATTORNEY

Dec. 6, 1927.
H. C. MALLORY
1,651,828
ENGINE COOLING SYSTEM
Filed July 22, 1921
2 Sheets-Sheet 2
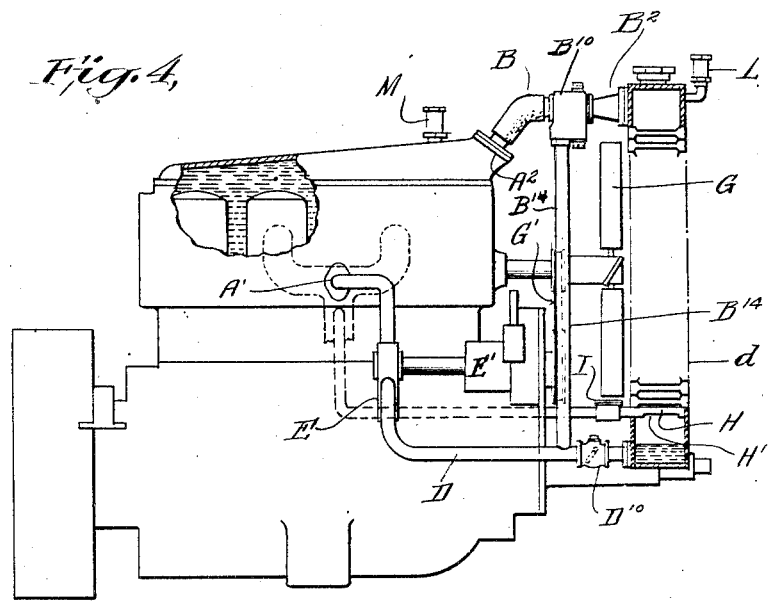
Fig. 4,
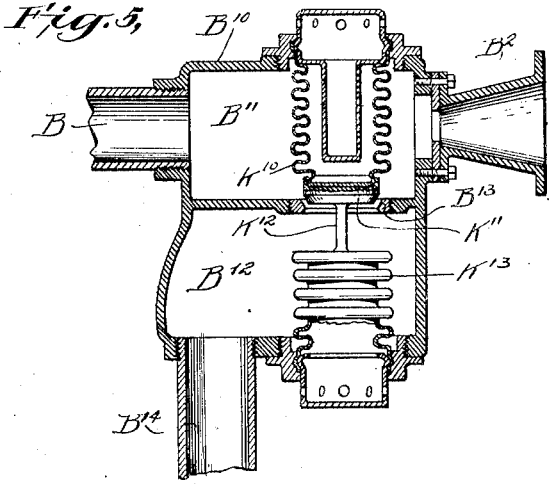
Fig. 5,
INVENTOR
HARRY C. MALLORY
BY John E. Hubbell
ATTORNEY Patented Dec. 6, 1927.

1,651,828

UNITED STATES PATENT OFFICE.

HARRY C. MALLORY, OF NEW YORK, N. Y.; SUE R. MALLORY ADMINISTRATRIX OF SAID HARRY C. MALLORY, DECEASED.

ENGINE-COOLING SYSTEM.

Application filed July 22, 1921. Serial No. 486,685.

My present invention consists in an improved method of and apparatus for cooling especially devised for use in cooling the cylinders of internal combustion engines used on automobiles, aeroplanes and the like. The general object of my present invention is to provide an effective method of and apparatus for the purpose specified characterized by the provisions made for obtaining a forced flow or circulation of cooling liquid through the engine cooling jacket or other cooling receptacle under conditions tending to eliminate or minimize the formation of air and vapor pockets in the jacket, and for vaporizing a portion of the cooling liquid outside of the jacket, and for dissipating the necessary heat in a condenser in which the vapor produced is condensed. Preferably the circulation through the jacket is regulated by varying the temperature, or rate of flow, or both temperature and rate of flow of the cooling liquid entering the jacket so as to maintain an approximately constant temperature in the upper and hottest portion of the latter notwithstanding variations in load or the temperature of the external atmosphere.

In a preferred mode of carrying out the invention I pass both the vapor generated and the portion of the cooling liquid not vaporized directly into the condenser from the hot well of which the mixture of unvaporized liquid and liquid of condensation are returned to the jacket by a suitable circulating pump, and maintain a liquid pressure in the jacket appreciably higher than the pressure maintained in the condenser so that when the pressure of the liquid is reduced in its passage from the jacket to the condenser a portion of the liquid bursts into vapor. Advantageously I provide automatic means for regulating the circulation so as to maintain the desired approximately constant temperature at the top of the jacket. This may be accomplished, for example, by a thermostatic regulation of the pressure in the condenser to thereby increase or decrease the temperature of the water returned to the jacket from the condenser as required to maintain the desired temperature in the jacket.

In an alternative method of regulation, I vary the rate at which liquid is passed through the jacket or cooling space as required to obtain the desired temperature in the jacket. This rate of flow regulation may be obtained, for example, by means of a thermostatically controlled by-pass about the pump employed to force the water through the jacket.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred embodiment of my invention.

Of the drawings:

Fig. 4 is an elevation of a system having a modified form of automobile temperature control; and Fig. 5 is a sectional elevation showing a portion of the apparatus of Fig. 4 on a larger scale.

Figure 1:
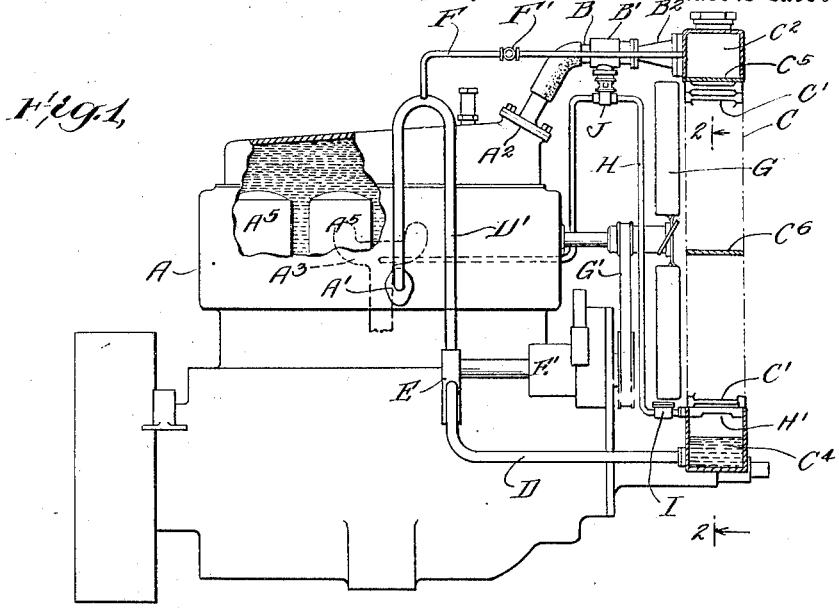
Fig. 1 is an elevation with parts broken away and in section of an automobile engine equipped with my improved cooling system.
Figure 2:
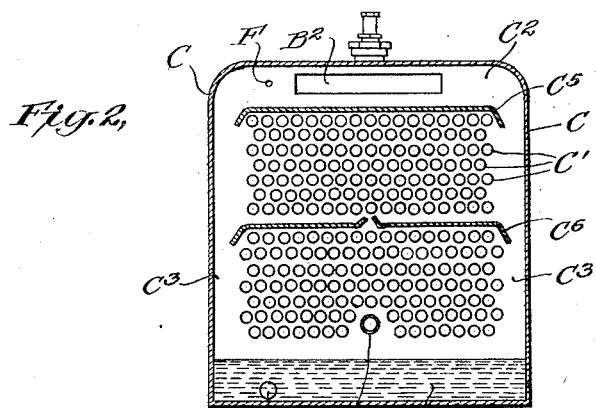
Fig. 2 is a section on the line 2—2 of Fig. 1.
Figure 3:
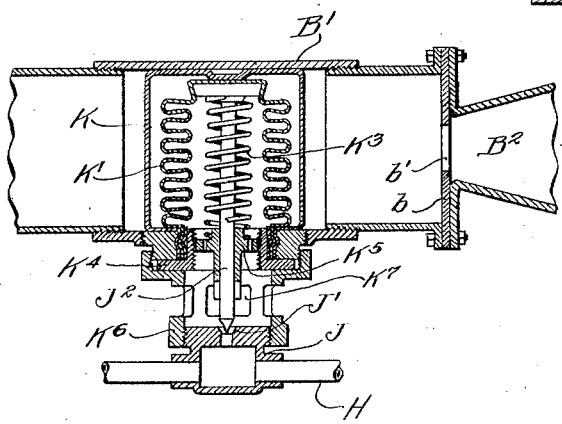
Fig. 3 is a sectional elevation of a portion of the piping and control mechanism employed in Fig. 1.

In the apparatus shown in Figs. 1, 2 and 3, A represents the cooling liquid jacket for the cylinders $A^5$ of an ordinary internal combustion automobile engine. An inlet $A'$ is provided at the bottom of the jacket space for the cooling liquid which will ordinarily be water, or a water and alcohol mixture. $A^2$ represents an upper outlet from the jacket. As shown the outlet $A^2$ opens from the end of the jacket space near its top. The jacket outlet $A^2$ is connected to the top of a condenser C by piping comprising sections B, B' and $B^2$. The section $B^2$ forms in effect the body of an expansion nozzle the throat orifice of which is formed by a plate $b$ having a central orifice $b'$. As shown the orifice plate $b$ is bolted between the adjacent flanged end portions of the piping sections B' and $B^2$. As shown the nozzle $B^2$ is pyramidal in form and opens into the top chamber $C^2$ of the condenser C.

The condenser C is shown as comprising a group of horizontally disposed condensing tubes C' expanded at their ends and connected together, the condenser being in this respect similar in construction to the air cooled radiator employed on an automobile having the ordinary water circulating engine cooling system. The bank of tubes C' is spaced away from the top edge of the condenser to provide the chamber C², and is spaced away from the bottom edge of the condenser to provide a hot well C⁴, and is spaced away from the side edges of the condenser to provide steam distributing and water flow channels C³ extending vertically downward from the chamber C² to the chamber C³. A baffle C⁵ covers the top of the bank of tubes C' and serves to divert the unvaporized liquid and vapor entering the condenser from the nozzle B² to the channels C³. Advantageously rain plates C⁶ are arranged within the bank of tubes as shown to divert water of condensation formed in the intertube space above these rain plates into the channels C³.

D represents the outlet pipe for liquid running from the hot wall space C⁴ of the condenser to the inlet of the circulating pump E. The outlet from the latter is connected by a pipe D' to the jacket inlet A'. Advantageously the pipe D' comprises a goose neck portion extending to the top of the jacket and connected at its top by a vent pipe F which runs to the condenser and contains a non-return valve F' permitting flow through the pipe F from the condenser into the pipe D' but preventing flow in the opposite direction. The purpose of the goose neck and vent connection described is to prevent the jacket A from draining into the hot well of the condenser when the circulating pump stops. This purpose may be accomplished also by the use of a check valve D¹⁰ in the pipe D as shown in Fig. 4. The circulating pump, which may be of the rotary type commonly employed as a circulating device in liquid cooling systems, may be driven from the engine shaft by the reduction gear E' which, through the belt G', also drives a fan G for drawing air through the open ended tubes C'.

In the constructions illustrated air is withdrawn from the condenser by means of an air pipe H running from the condenser to the suction intake manifold A³ of the engine or other air exhausting device capable of exerting the desired suction on the pipe H. As shown the pipe H extends into the condenser and is provided within the latter with an orifice H' at its under side through which air may pass out of the condenser but into which water of condensation will not fall. The pipe H may include an air valve I preventing the outflow of steam and water while permitting the escape of air from the condenser through the pipe H.

In the apparatus shown in Figs. 1, 2 and 3, the pressure in the condenser is regulated by provisions automatically controlling the accumulation of air therein. The provisions shown for this purpose comprise a valve J in the pipe H having a port J' adapted to be closed by a valve member in the form of a rod J² actuated by a thermostatic control mechanism K mounted in the pipe section B and swept by the liquid passing out of the jacket to the condenser. The mechanism K comprises a rigid external shell. Mounted within this shell and uniting with the latter to form a vaporizable liquid container is a bellows K' having its upper end closed and connected to the upper end of the valve member J². The lower end of the rod J² is guided by a sleeve member K⁵ threaded into an annular member K⁴ having a flange clamped between the pipe section B and the tubular coupling K⁶ by which the valve casing J is mechanically connected to the pipe section B. The sleeve K⁵ forms the lower abutment for a spring K³ interposed between it and the flanged upper end of the rod J². By adjusting the sleeve K⁵ in the threaded member K⁴, the tension of the spring K³ may be adjusted. Openings K⁷ in the coupling part K⁶ permit of the adjustment of the part K⁵ with the apparatus assembled, but in general this adjustment should be effected in the shop rather than in the field.

In the operation of the apparatus shown in Figs. 1, 2 and 3, the cooling liquid is forced into the jacket from the hot well of the condenser at a rate dependent upon the capacity of the pump and the speed of operation of the engine. The pressure of the liquid leaving the jacket through the outlet A² is reduced as the liquid passes through the piping B, B' and B², the bulk of the pressure drop occurring at the orifice b' in the particular construction illustrated. When this reduction in pressure occurs, a portion of the liquid, when heated as it will be in normal operation, is converted into vapor, and the unvaporized residue of the liquid is cooled to the temperature corresponding to the temperature of the saturated vapor of the liquid at the pressure maintained in the condenser. The amount of liquid converted into vapor will depend, of course, on the difference between the temperature of the liquid leaving the jacket and the temperature of saturated vapor of the liquid at the pressure in the condenser. An increase or decrease in temperature of the liquid leaving the jacket causes the thermostat K to open or close the port J'. The opening or closing of the port J' causes an increase or decrease in the air flow through the port thereby raising or lowering the pressure in the condenser and causing a corresponding smaller or greater difference between the temperature of the liquid leaving the jacket and the temperature of saturated vapor of the liquid at the pressure in the condenser. The effect of the operation of the thermostat K, therefore, is the increasing or decreasing of the portion of the cooling liquid vaporized on a given increase or decrease in temperature at a rate more rapid than if the thermostatically controlled valve were not used. The provision of the expansion nozzle B' avoids an excessive velocity of steam and liquid discharge into the condenser. The liquid and vapor entering the condenser C are directed from the chamber C² thereof into the channels C³ from which the vapor passes into the intertube space of the condenser and is condensed, while the unvaporized liquid entering the top of the channels C³ passes through the latter into the hot well C⁴ into which the liquid of condensation formed in the condenser eventually accumulates and from which the mixture of unvaporized liquid entering the condenser and liquid of condensation formed therein is returned to the jacket.

The temperature which the thermostatic valve mechanism K is set to maintain in normal operation will ordinarily be somewhere between 150 and 190° F. though a temperature higher or lower than this range can be maintained if considered necessary and in particular a temperature above 212° may be employed if desirable. When the temperature of the liquid leaving the jacket is below that at which the thermostatic device K holds the valve member J² in its closed position, the pressure in the condenser will be that of the atmosphere and practically none of the cooling liquid leaving the jacket will be converted into vapor unless the thermostatic device K is adjusted to respond to a temperature above 212°. When the apparatus thus operates without vapor generation and condensation the cooling liquid will be returned to the jacket from the condenser hot well at a temperature but little below that at which it leaves the jacket. As soon, however, as the temperature of the cooling liquid leaving the jacket rises so as to cause the thermostatic device K to move the valve member J² against its seat, air will be exhausted from the condenser through the air line H, and the pressure in the condenser will be correspondingly lowered. With this reduction in the condenser pressure a portion of the cooling liquid will be converted into vapor in its passage through the expansion nozzle B² and the cooling liquid returned to the jacket from the condenser hot well will be correspondingly cooled from the temperature at which the cooling liquid leaves the jacket. A reduction in the temperature at which the cooling liquid is passed into the jacket tends of course to a reduction in the temperature of the cooling liquid when it leaves the jacket, and in the preferred contemplated operation of the apparatus disclosed the thermostatic device K increases and decreases the pressure in the condenser, and correspondingly decreases and increases the temperature of the water passing from the condenser to the jacket as required to maintain the desired temperature of the cooling water at the jacket outlet A². The fact that with my invention the water passing through the condenser is subjected to but a relatively small cooling action when the valve J² is off its seat, tends to a quick heating up of the cooling liquid in starting the engine which is especially desirable in cold weather.

In the modified form of my invention illustrated in Figs. 4 and 5 the pipe section B' first described, is replaced by a valve casing B¹⁰ comprising a chamber B¹¹ forming a thoroughfare between the pipe sections B and B² and a second chamber B¹² connected to the chamber B¹¹ by the valve seated port B¹³. The chamber B¹² in conjunction with a pipe B¹⁴, forms a by-pass about the condenser and the expansion nozzle section B² to the inlet side of the pump. The flow through the by-pass is controlled by a valve member K¹¹ carried by an expansible bellows thermostatic element K¹⁰ located in the thoroughfare B¹¹. In the particular construction shown a stem K¹² connects the valve member K¹¹ to the end of a bellows K¹³ located in the chamber B¹² and having its lower end anchored to the corresponding wall of the chamber B¹². The purpose of the bellows K¹³, which is of the same diameter as the bellows K¹⁰, is to minimize the effect on the thermostatic valve mechanism of pressure fluctuations in the pressure of the circulating liquid. In the modifications shown in Figs. 4 and 5 the goose neck in the connection between the chamber E and the inlet to the jacket is dispensed with, and in lieu thereof a check valve D¹⁰ is placed in the pipe D between the condenser and the junction with the pipe D of the by-pass B¹⁴.

In the contemplated mode of operation of the apparatus shown in Figs. 4 and 5, the valve K¹¹ will be off its seat and the liquid leaving the jacket will pass wholly or mainly back to the jacket through the by-pass pipe B¹⁴ so long as the temperature of the liquid leaving the jacket is below that which the apparatus is designed to maintain. When the liquid leaving the jacket rises to the maximum value desired the thermostat K¹⁰ expands and seats the valve K¹¹ whereupon the liquid is diverted from the by-pass into the condenser and is thereby reduced in temperature. In this form of my invention the condenser may be operated at all times under a vacuum and the jacket temperature is not dependent on the exact degree of vacuum maintained provided, of course, that it is sufficient to furnish the maximum cooling effect required. Advantageously, however, a vacuum relief valve L is provided which opens and admits air to the condenser when the vacuum therein exceeds the predetermined amount. In normal operation the valve $J^2$ of Figs. 1, 2 and 3, and the valve $K^{11}$ of Figs. 4 and 5, and the valve L, when the latter is employed, will each normally be "cracked" so as to permit the restricted flow past the valve required to obtain the desired regulation.

Specific claims on the construction illustrated in Figs. 4 and 5 and on the specific methods of operation in which that construction is employed are made in my copending application, Serial No. 627,014, filed 23d March, 1923, as a division of this application.

While in accordance with the provisions of the statutes I have illustrated and described the best forms of my present invention now known to me, it will be apparent to those skilled in the art that changes may be made in the form of my invention without departing from the spirit of my invention as set forth in the appended claims, and that certain features of my invention may sometimes be used to advantage without a corresponding use of other features.

Having now described my invention, what I claim as new and desire to secure by Letters Patent, is:

1. The method of engine cooling which consists in passing a cooling liquid through the engine jacket, reducing the pressure of the liquid leaving the jacket and thereby converting a portion of the liquid into vapor, condensing said vapor, returning the liquid of condensation and the unvaporized portion of the liquid to the jacket, and varying the pressure to which the liquid leaving the jacket is reduced to thereby regulate the temperature in the jacket.

2. The method of engine cooling which consists in passing a cooling liquid through the engine jacket, reducing the pressure of the liquid leaving the jacket and thereby converting a portion of the liquid into vapor, condensing the vapor thereby formed, returning the resultant liquid of condensation and the unvaporized liquid to the jacket, and varying the pressure to which the liquid leaving the jacket is reduced in automatic response to the temperature of the liquid in the jacket as required to maintain an approximately constant temperature at the jacket outlet.

3. The method of engine cooling which consists in passing liquid through the engine jacket, reducing the pressure of the liquid leaving the jacket and thereby converting a portion of said liquid into vapor, condensing said vapor in a condenser, returning liquid of condensation from the condenser to the jacket, and varying the pressure in the condenser to regulate the temperature in the jacket.

4. The method of engine cooling which consists in passing liquid through the engine cooling jacket, reducing the pressure of the liquid leaving the jacket and thereby converting a portion of the liquid into vapor, passing said vapor and a portion of the liquid not vaporized into a condenser, returning liquid from the condenser to the jacket, and varying the pressure in the condenser to regulate the temperature in the jacket.

5. The method of engine cooling which consists in passing a cooling liquid through the engine jacket, converting into vapor a portion of the liquid leaving the jacket which portion increases and decreases as the temperature of the liquid leaving the jacket rises and falls at a rate more rapid than the rate of temperature variation, condensing the vapor formed and returning it and the unvaporized portion of the liquid to the jacket.

6. In an engine cooling system, the combination with the engine jacket, of a condenser, a connection between the jacket and the top of the condenser restricted to effect an appreciable drop in pressure therein, and means for returning liquid from the bottom of the condenser to the jacket.

7. In an engine cooling system, the combination with the engine jacket, of a condenser, a connection between the jacket and the condenser restricted to effect an appreciable drop in pressure therein, means for returning liquid from the bottom of the condenser to the jacket, and means for regulating the pressure in said condenser.

8. In an engine cooling system, the combination with the engine jacket, of a condenser, a connection between the jacket and the condenser restricted to effect an appreciable drop in pressure therein, means for returning liquid from the bottom of the condenser to the jacket, and thermostatic means responsive to the temperature in the jacket for regulating the pressure in said condenser.

9. In an engine cooling system, the combination with the engine jacket, of a condenser, a connection between the jacket and the condenser restricted to effect an appreciable drop in pressure therein, means for returning liquid from the bottom of the condenser to the jacket, means tending to eliminate air from the condenser and means for admitting air to the condenser.

10. In an engine cooling system, the combination with the engine jacket, of a condenser, a connection between the jacket and the condenser restricted to effect an appreciable drop in pressure therein, means for returning liquid from the bottom of the condenser to the jacket, means tending to eliminate air from the condenser, and means responsive to the jacket temperature for admitting air to the condenser.

11. In an engine cooling system, the combination with an engine cooling jacket having a top outlet, of a surface condenser comprising distributed condensing surfaces, a connection from said outlet to the upper portion of the condenser restricted to effect an appreciable pressure drop between the jacket and condenser, and means within the condenser for diverting liquid away from said condensing surfaces, and means for passing liquid from the bottom of the condenser into said jacket.

12. In an engine cooling system, the combination with an engine jacket having a top outlet, of a surface condenser comprising distributed condensing surfaces, a connection from said outlet to the upper portion of the condenser restricted to effect an appreciable pressure drop in fluid flowing from the jacket to the condenser, means within the condenser for diverting liquid away from the condensing surfaces, a pump for passing liquid from the bottom of the condenser into said jacket, and thermostatic means responsive to the temperature of the liquid in the jacket for regulating the pressure in the condenser.

Signed at New York in the county of New York and State of New York this 21st day of July, A. D. 1921.

HARRY C. MALLORY.